(12) United States Patent
Rowe et al.

(10) Patent No.: US 9,488,019 B1
(45) Date of Patent: Nov. 8, 2016

(54) MEMS-LOST CIRCULATION MATERIALS FOR EVALUATING FLUID LOSS AND WELLBORE STRENGTHENING DURING A DRILLING OPERATION

(71) Applicant: Halliburton Energy Services, Inc., Houston, TX (US)

(72) Inventors: Matthew Dennis Rowe, Lafayette, LA (US); Clinton Cheramie Galliano, Houma, LA (US); Walter Varney Andrew Graves, Lafayette, LA (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/784,146

(22) PCT Filed: Dec. 30, 2014

(86) PCT No.: PCT/US2014/072663
§ 371 (c)(1),
(2) Date: Oct. 13, 2015

(87) PCT Pub. No.: WO2016/108829
PCT Pub. Date: Jul. 7, 2016

(51) Int. Cl.
*E21B 33/13* (2006.01)
*E21B 33/138* (2006.01)
*E21B 21/08* (2006.01)
(Continued)

(52) U.S. Cl.
CPC .............. *E21B 21/08* (2013.01); *C09K 8/03* (2013.01); *E21B 7/00* (2013.01); *E21B 21/003* (2013.01); *E21B 21/062* (2013.01); *E21B 47/00* (2013.01); *E21B 33/03* (2013.01)

(58) Field of Classification Search
CPC .... C09K 2208/08; C09K 8/487; C09K 8/50; G01N 2015/1493; E21B 47/10; E21B 33/138; E21B 47/102; E21B 47/1015; E21B 33/13
See application file for complete search history.

(56) References Cited

U.S. PATENT DOCUMENTS

| 4,222,444 | A | * | 9/1980 | Hamilton | ............... C09K 8/035 166/253.1 |
| 4,460,052 | A | | 7/1984 | Gockel | |

(Continued)

OTHER PUBLICATIONS

International Search Report and Written Opinion for PCT/US2014/072663 dated Sep. 1, 2015.
(Continued)

*Primary Examiner* — Kipp Wallace
(74) *Attorney, Agent, or Firm* — McDermott Will & Emery LLP; Alan Bryson

(57) ABSTRACT

Micro-electro-mechanical systems lost circulation materials (MEMS-LCMs) of various sizes, shapes, and specific gravities may be used in a drilling fluid to determine the preferred LCMs for use in wellbore strengthening of the wellbore. For example, a method may include drilling at least a portion of a wellbore penetrating a subterranean formation with a drilling fluid that comprises a base fluid, a plurality of MEMS-LCMs, and a plurality of LCMs, wherein the MEMS-LCMs and the LCMs are substantially similar in size, shape, and specific gravity; measuring a first concentration of the MEMS-LCMs in the drilling fluid before circulating the drilling fluid through the wellbore; measuring a second concentration of the MEMS-LCMs in the drilling fluid after circulating the drilling fluid through the wellbore; performing a comparison of the first and second concentrations of the MEMS-LCMs; and changing a composition of the drilling fluid based on the comparison.

18 Claims, 4 Drawing Sheets

(51) Int. Cl.
  *E21B 21/00* (2006.01)
  *E21B 21/06* (2006.01)
  *E21B 47/00* (2012.01)
  *E21B 7/00* (2006.01)
  *C09K 8/03* (2006.01)
  *E21B 33/03* (2006.01)

(56) References Cited

U.S. PATENT DOCUMENTS

| | | |
|---|---|---|
| 4,836,940 A | 6/1989 | Alexander |
| 5,905,061 A | 5/1999 | Patel |
| 5,977,031 A | 11/1999 | Patel |
| 6,828,279 B2 | 12/2004 | Patel et al. |
| 6,898,529 B2 | 5/2005 | Gao et al. |
| 8,172,007 B2 | 5/2012 | Dolman et al. |
| 9,038,718 B1 * | 5/2015 | Karimi ............ E21B 21/003 166/278 |
| 2008/0236814 A1 * | 10/2008 | Roddy ............ E21B 47/12 166/250.01 |
| 2008/0316049 A1 * | 12/2008 | Verret ............ E21B 47/10 340/854.6 |
| 2009/0145664 A1 | 6/2009 | Larson et al. |
| 2009/0211754 A1 * | 8/2009 | Verret ............ E21B 47/10 166/250.12 |
| 2010/0139386 A1 | 6/2010 | Taylor |
| 2010/0258303 A1 | 10/2010 | Alberty |
| 2010/0307745 A1 * | 12/2010 | Lafitte ............ C09K 8/62 166/250.12 |
| 2011/0192592 A1 | 8/2011 | Roddy et al. |
| 2012/0178653 A1 * | 7/2012 | McClung, III ......... B82Y 15/00 507/269 |
| 2016/0208567 A1 * | 7/2016 | Carrasquilla ......... E21B 33/138 |

OTHER PUBLICATIONS

Savari et al., Resilient Lost Circulation Material (LCM): A Significant Factor in Effective Wellbore Strengthening, 2012, SPE 153154.

* cited by examiner

US 9,488,019 B1

MEMS-LOST CIRCULATION MATERIALS FOR EVALUATING FLUID LOSS AND WELLBORE STRENGTHENING DURING A DRILLING OPERATION

BACKGROUND

The present disclosure relates to wellbore strengthening and fluid loss control.

Lost circulation is one of the larger contributors to nonproductive time in a wellbore drilling operation. Lost circulation arises from drilling fluid leaking into the formation via undesired flow paths (e.g., permeable sections, natural fractures, and induced fractures). Lost circulation treatments or pills may be used to remediate the wellbore by plugging the fractures before drilling can resume.

Generally, drilling is performed with an overbalance pressure such that the wellbore pressure is maintained within the mud weight window (i.e., the area between the pore pressure and the fracture pressure), FIG. 1. The term "overbalance pressure," as used herein, refers to the amount of pressure in the wellbore that exceeds the pore pressure. The term "pore pressure," as used herein, refers to the pressure of fluids in the formation. Overbalance pressure is needed to prevent reservoir fluids from entering the wellbore. The term "fracture pressure," as used herein, refers to a pressure threshold where pressures exerted from the wellbore onto the formation in excess of the pressure threshold cause one or more fractures in the subterranean formation. Wider mud weight windows allow for drilling with a reduced risk of lost circulation.

In traditional subterranean formations, the mud weight window may be wide, FIG. 1. However, in formations having problematic zones (e.g., depleted zones, high-permeability zones, highly tectonic areas with high in-situ stresses, or pressurized shale zones below salt layers), the mud weight window may be narrower and more variable, FIG. 2. When the overbalance pressure exceeds the fracture pressure, a fracture may be induced and lost circulation may occur. By incorporating a lost circulation material (LCM) in the fracture to temporarily plug the fracture, the compressive tangential stress in the near-wellbore region of the subterranean formation increases, which translates to an increase in the fracture pressure, thereby widening the mud weight window, FIG. 3.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The present disclosure relates to wellbore strengthening and fluid loss control and, more specifically, determining a size distribution of LCM suitable for use in strengthening a wellbore. The methods described herein utilize micro-electro-mechanical systems (MEMS) LCMs of various size, shapes, and specific gravities in a drilling fluid. The MEMS-LCMs may then become incorporated into fractures as would traditional LCMs. Identification of the size, shape, and/or specific gravity of the MEMS-LCMs that become incorporated in the fractures may, then, be used to determine the preferred LCMs for use in wellbore strengthening of the wellbore.

As used herein, the term "MEMS-LCMs" refers to materials that are or mimic lost circulation materials that have incorporated therewith at least one MEMS. Generally, the methods described herein utilize a plurality of different MEMS-LCMs that vary by size, shape, specific gravity, or a combination thereof. Each type of MEMS-LCMs (i.e., each MEMS with a specific size, shape, and specific gravity) may have a unique identifying signature (e.g., a signal emitted or a passive tag). This identifying signature may then be detected in order to determine or monitor the presence, absence, or concentration of each type of MEMS-LCMs.

Figure 1:
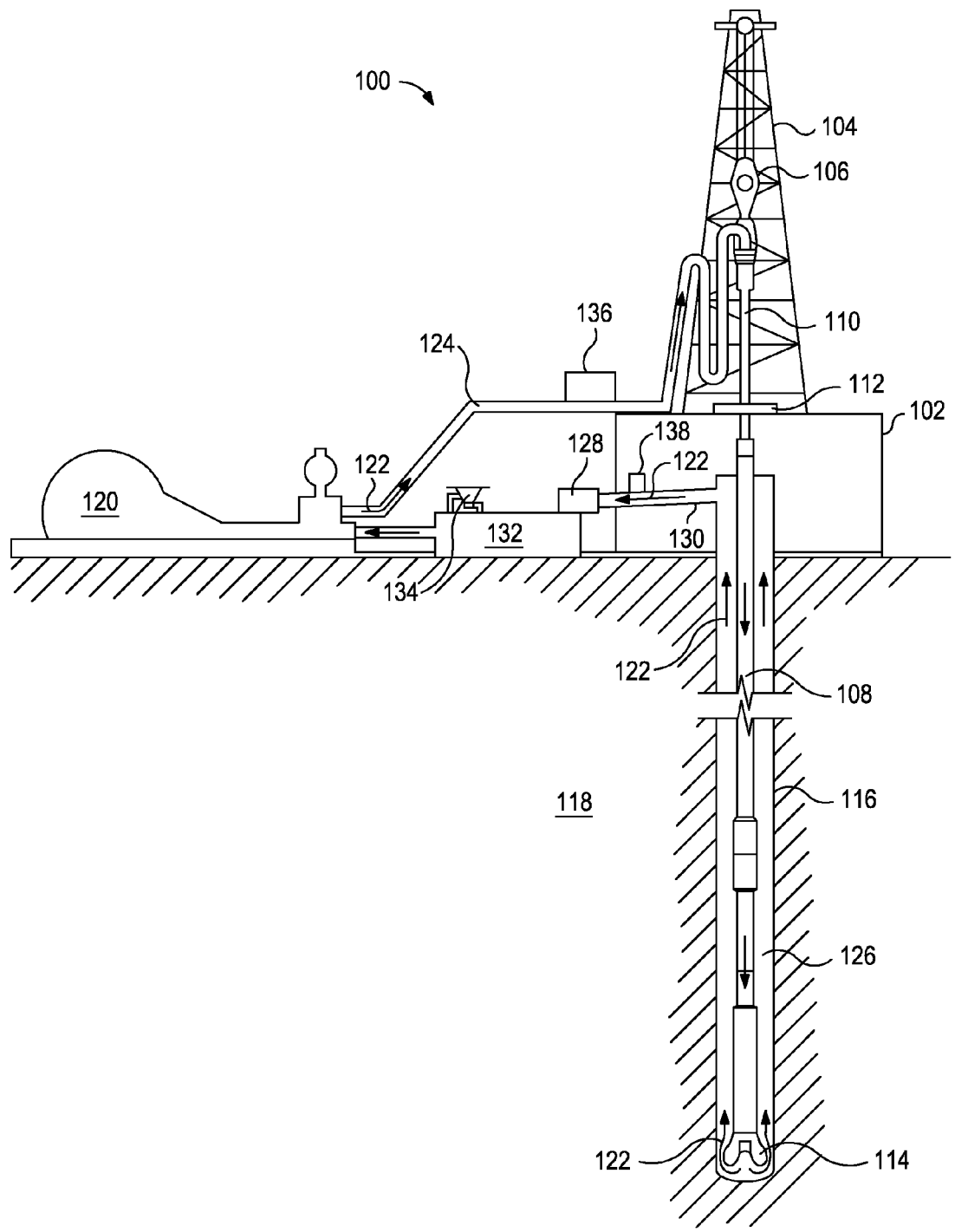
FIG. 1 provides an illustrative diagram of an exemplary wellbore drilling assembly suitable for implementing micro-electro-mechanical systems (MEMS) LCMs to analyze wellbore strengthening and lost circulation according to at least some embodiments described herein.

FIG. 1 provides an illustrative diagram of an exemplary wellbore drilling assembly 100 suitable for implementing MEMS-LCMs to analyze wellbore strengthening and lost circulation according to at least some embodiments described herein. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates a drilling fluid 122 (e.g., comprising a base fluid, MEMS-LCMs, and optionally LCMs) through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the disclosed MEMS-LCMs and optional LCMs may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the MEMS-LCMs and optional LCMs may be added to the drilling fluid 122 at any other location in the drilling assembly 100. In at least one embodiment, for example, there could be more than one retention pit 132, such as multiple retention pits 132 in series. Moreover, the retention pit 132 may be representative of one or more fluid storage facilities and/or units where the MEMS-LCMs and optional LCMs may be stored, reconditioned, and/or regulated until added to the drilling fluid 122.

As the drilling fluid 122 circulates through the wellbore, at least some of the MEMS-LCMs, depending on their characteristics (e.g., size, shape, and specific gravity), may flow into the subterranean formation 118 (i.e., lost circulation). Additionally, at least some of the MEMS-LCMs may become incorporated in fracture plugs that provide for wellbore strengthening. Further, at least some of the MEMS-LCMs may stay within the drilling fluid 122 and return to the surface.

In some instances, the amount and type of MEMS-LCMS lost from the drilling fluid due to lost circulation and wellbore strengthening may be determined by analyzing and comparing the concentration of each type of MEMS-LCMS in the drilling fluid 122 before introduction into the wellbore and after exiting the wellbore. For example, MEMS detectors 136,138 (described further herein) may be included along the drilling fluid flow path of the drilling assembly 100 at, for example, the feed pipe 124 and the flow line 130, respectively.

In some instances, when a plurality of different types of MEMS-LCMs are used in the drilling fluid 122 that vary by size, density, and shape, a distribution profile of each variable may be extrapolated for the MEMS-LCM before and after introduction into the wellbore 116. Then, the before and after distribution profiles for each variable may be compared to independently identify sizes, densities, and shapes that decrease in concentration after circulation through the wellbore. LCMs may be added or increased in concentration in the drilling fluid 122 that have or are similar to all three of the independently identified properties.

Figure 2:
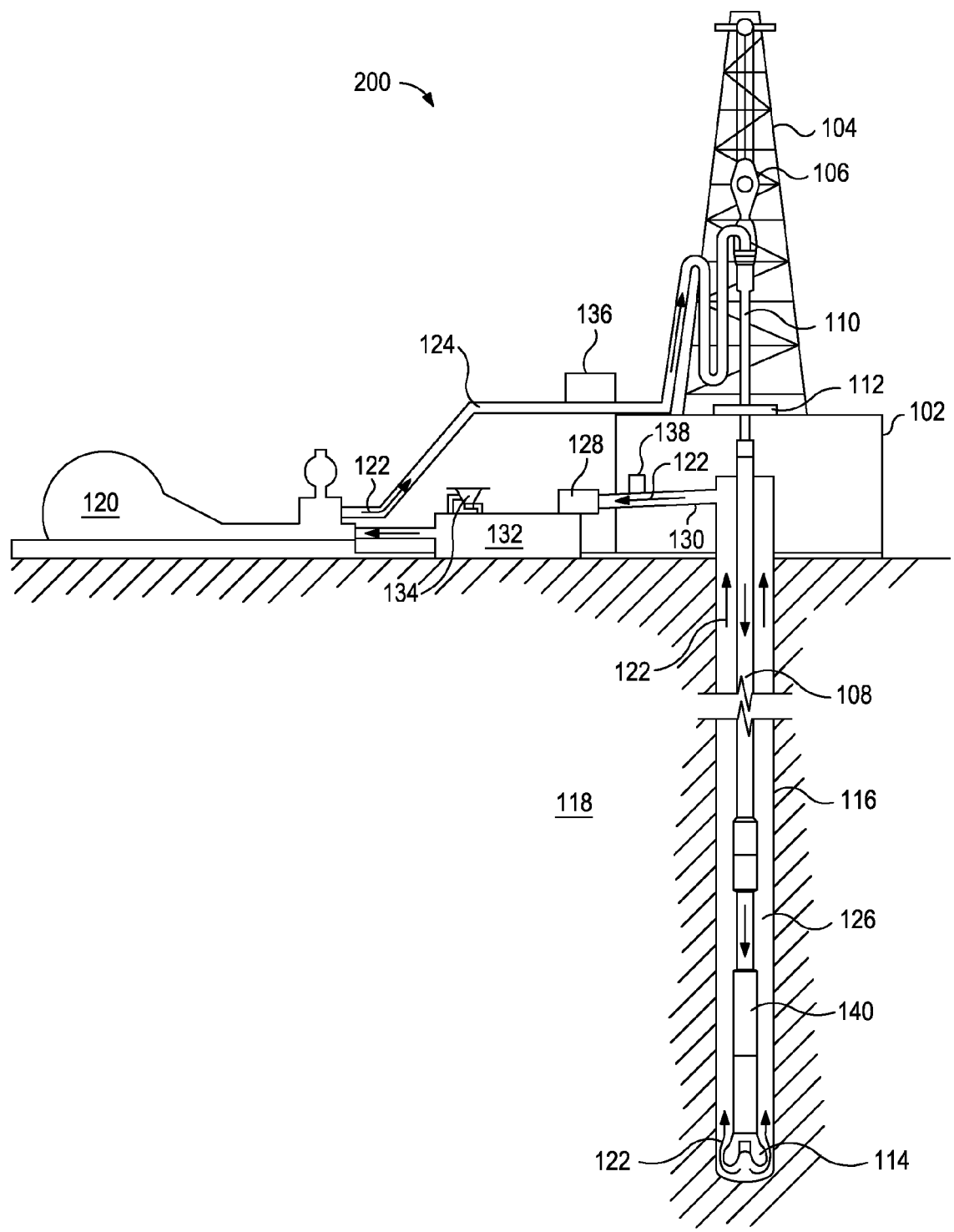
FIG. 2 provides an illustrative diagram of an exemplary wellbore drilling assembly suitable for implementing MEMS-LCMs to analyze wellbore strengthening and lost circulation according to at least some embodiments described herein.

Referring now to FIG. 2, with continued reference to FIG. 1, illustrated is an exemplary wellbore drilling assembly 200 suitable for implementing MEMS-LCMs to analyze wellbore strengthening and lost circulation according to at least some embodiments described herein. The wellbore drilling assembly 200 is similar to that of the wellbore drilling assembly 100 of FIG. 1 with identical reference numbers to indicate the same structures or components described in reference to FIG. 1. However, the wellbore drilling assembly 200 includes a measurement while drilling (MWD) tool 140 coupled to the drill string 108. The MWD tool 140 may include MEMS sensors to detect the MEMS-LCMs downhole. Because the MWD tool 140 is downhole, the concentration and the type of MEMS-LCMs may be correlated to a downhole location or wellbore depth (e.g., the distance from the wellhead as measured along the wellbore 116).

In some instances, when the concentration of a MEMS-LCM at a location along the wellbore is detected to be higher than it should be in the drilling fluid 122, it may indicate that the MEMS-LCM is becoming incorporated in fractures along the wellbore and providing wellbore strengthening. Accordingly, the concentration of a commensurate LCM (i.e., having a substantially similar size, shape, and specific gravity) in the drilling fluid 122 may be increased to provide additional LCMs of suitable size to provide for wellbore strengthening. As used herein, the terms "substantially the same," "substantially similar," and other grammatical variations thereof refer to being within about 10% of a given value. For example, an LCM with a specific gravity of about 2.0 has substantially the same specific gravity as another LCM with a specific gravity of about 2.2.

In some instances, the concentration analysis of a MEMS-LCM in the drilling fluid 122 before introduction into the wellbore 116 and after return to the surface (e.g., using MEMS sensors 136,138, respectively) may indicate that the MEMS-LCM is being removed from the drilling fluid 122 (i.e., the concentration decreases). However, the measurements from a MEMS detector of the MWD-tool 140 may indicate that the MEMS-LCM is not accumulating in a near-wellbore location. This scenario may indicate that the MEMS-LCM is being lost to the formation (i.e., in the lost circulation portion of the drilling fluid). Further, this may indicate that the characteristics of the MEMS-LCM are insufficient to plug the fracture and mitigate or eliminate lost circulation. Accordingly, the concentration of a different LCM may be added to the drilling fluid 122 to mitigate lost circulation. In some instance, the LCM added to the drilling fluid 122 may be larger in size, more spherical in shape, greater in specific gravity, or a combination thereof. Without being limited by theory it is believed that such changes in size, shape, specific gravity, or a combination thereof may enhance plugging of the fractures that the MEMS-LCMs traverse during lost circulation into the formation 118.

Figure 3:
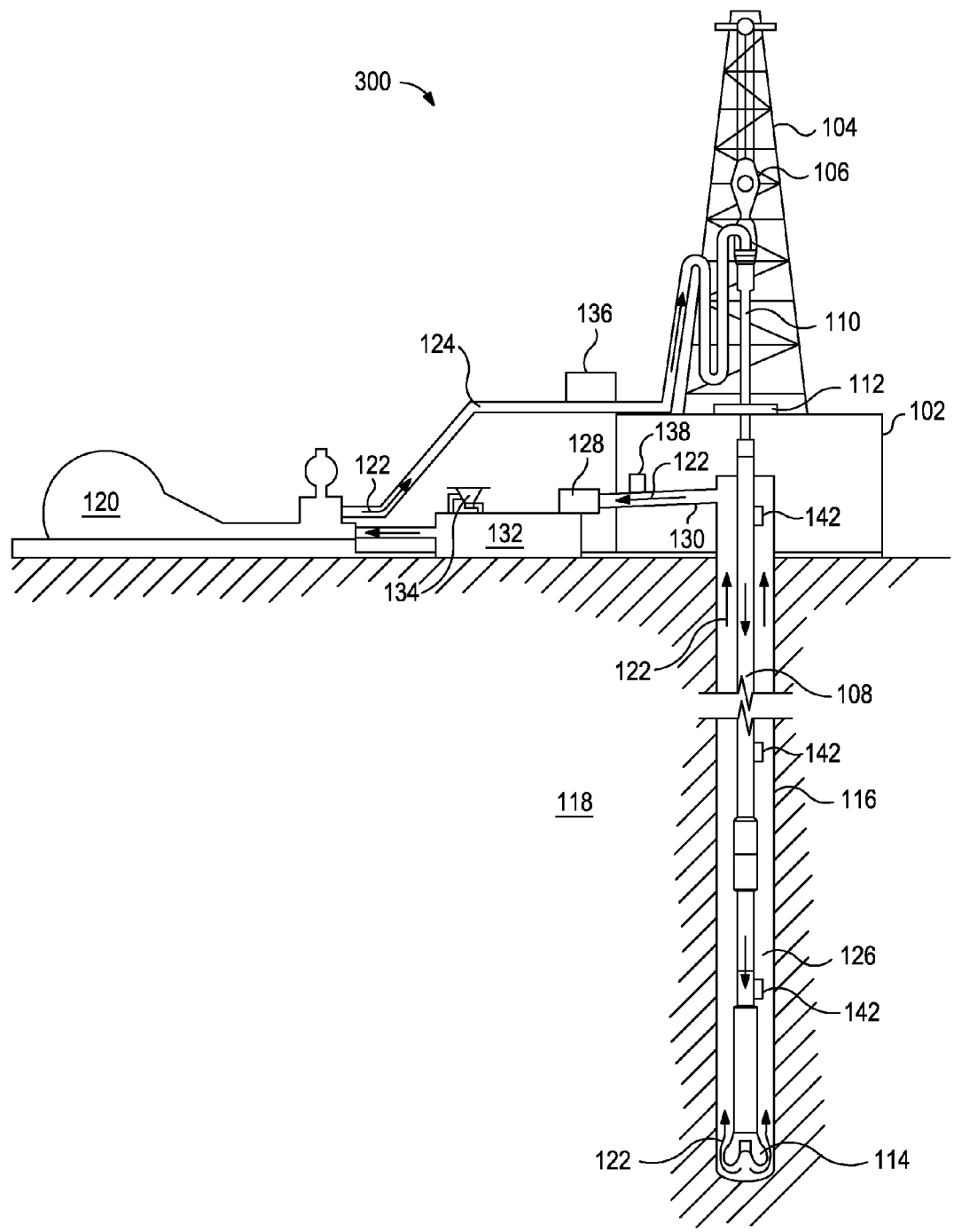
FIG. 3 provides an illustrative diagram of an exemplary wellbore drilling assembly suitable for implementing MEMS-LCMs to analyze wellbore strengthening and lost circulation according to at least some embodiments described herein.

Referring now to FIG. 3, with continued reference to FIGS. 1 and 2, illustrated is an exemplary wellbore drilling assembly 300 suitable for implementing MEMS-LCMs to analyze wellbore strengthening and lost circulation according to at least some embodiments described herein. The wellbore drilling assembly 300 is similar to that of the wellbore drilling assemblies 100,200 of FIGS. 1 and 2, respectively, with identical reference numbers to indicate the same structures or components described in reference to FIGS. 1 and 2. However, the wellbore drilling assembly 300 includes a plurality of MEMS sensors 142 coupled to and arranged along the drill string 108. Coupling of the MEMS sensors 142 may be achieved by, for example, mechanical fasteners, brazing or welding techniques, adhesives, magnets, the like, and combinations thereof. In some instances, a housing may be used to contain a MEMS sensor 142 and designed to withstand the pressures that may be experienced in the wellbore 116.

The MEMS sensors 142 may be utilized in methods similar to those described relative to the MWD-tool. However, the plurality of MEMS sensors 142 disposed coupled to the drill string 108 of the wellbore drilling assembly 300 may allow for analyzing the concentration of the MEMS-LCM at multiple locations along the wellbore 116. Additionally, having a plurality of MEMS sensors 142 disposed along the drill string (e.g., about one MEMS sensor 142 per every 1-5 pipe sections of the drill string 108) may allow for less movement of the drill string 108 along the wellbore 116 when identifying lost circulation zones.

While the MEMS sensors 136,138 are illustrated at the surface before and after the drilling fluid 122 are circulated through the wellbore 116, respectively, in some instances, one or both of the MEMS sensors 136,138 may be excluded from the drilling assembly 300.

Figure 4:
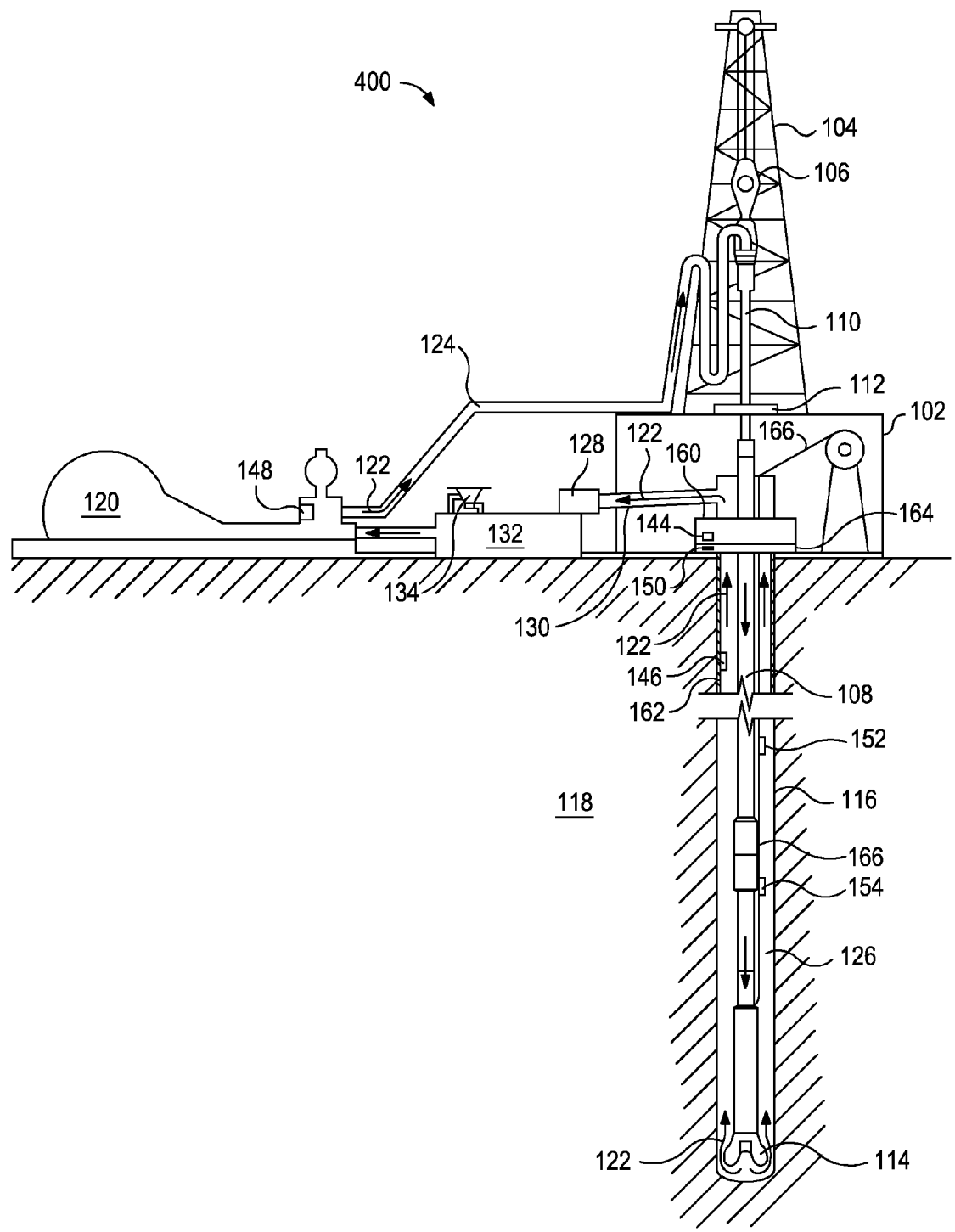
FIG. 4 provides an illustrative diagram of an exemplary wellbore drilling assembly suitable for implementing MEMS-LCMs to analyze wellbore strengthening and lost circulation according to at least some embodiments described herein.

Referring now to FIG. 4, with continued reference to FIGS. 1-3, illustrated is an exemplary wellbore drilling assembly 400 suitable for implementing MEMS-LCMs to analyze wellbore strengthening and lost circulation according to at least some embodiments described herein. The wellbore drilling assembly 400 is similar to that of the wellbore drilling assemblies 100,200,300 of FIGS. 1-3, respectively, with identical reference numbers to indicate the same structures or components described in reference to FIGS. 1-3. However, the wellbore drilling assembly 400 includes a wellhead 164 where the wellbore 116 meets the surface. A blowout preventer (BOP) 160 is coupled to the wellhead 164 where the drill string 108 passes through the BOP 160 and the wellhead 164 before entering the wellbore 116. The drilling assembly 400 also includes a wireline 166 that is run through the BOP 160 and the wellhead 164 and extends into the wellbore 116. As illustrated, the wireline 166 is coupled to the drill string 108 near the drill bit 114, which may be useful in transmitting power or communicating with the drill bit 114 (or alternatively could be coupled to a MWD tool 140 illustrated in FIG. 2). MEMS sensors 144,150 may be coupled to the BOP 144 and the wellhead 164, respectively. This configuration may be used to analyze MEMS-LCM loss to other parts of the well including, for example, due to cuttings bed buildup. Similar to the MEMS sensors 142 coupled to the drill string 108 in FIG. 3, a plurality of MEMS sensors 154 may be coupled to the wireline 166 for detecting MEMS-LCMs along the wellbore.

In the drilling assembly 400, a portion of the wellbore 116 has a casing 162. In some instances, MEMS sensors 146 may be coupled to the casing 162. Similar to the MEMS sensors 142 coupled to the drill string 108 in FIG. 3, a plurality of MEMS sensors 146 may be coupled to the casing 162.

As illustrated in FIGS. 1-4, MEMS sensors 136-152 may be included at a variety of locations along the path the drilling fluid 122 flows in a drilling assembly 100-400, which includes combinations of locations not explicitly illustrated. In general, MEMS sensors may be included at the wellhead 164, the pump 120, the BOP 160, the casing 162, the wireline 166, or a combination thereof, including combinations with the previously described MEMS sensor locations. Further, in subsea drilling assemblies, MEMS sensors may be coupled to a riser or a slip joint.

The drilling fluids 122 describe herein may comprise a base fluid, a plurality of MEMS-LCMs, and optionally LCMs.

Base fluids suitable for use in conjunction with the drilling fluid described herein may be oil-based fluids, aqueous-based fluids, aqueous-miscible fluids, water-in-oil emulsions, or oil-in-water emulsions. Suitable oil-based fluids may include alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, potassium carbonate, and any combination thereof), any in combination with an aqueous-based fluid, and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base treatment fluid, where the amount may range from any lower limit to any upper limit and encompass any subset therebetween. Examples of suitable invert emulsions include those disclosed in U.S. Pat. No. 5,905,061, U.S. Pat. No. 5,977,031, and U.S. Pat. No. 6,828,279. It should be noted that for water-in-oil and oil-in-water emulsions, any mixture of the above may be used including the water phase being or including an aqueous-miscible fluid.

When included, the LCMs may be included in a drilling fluid 122 described herein at about 0.25 pound per barrel (PPB) to about 150 PPB in the drilling fluid, including any subset therebetween.

Examples of LCMs may include, but are not limited to, sand, shale, ground marble, bauxite, ceramic materials, glass materials, metal pellets, high strength synthetic fibers, resilient graphitic carbon, cellulose flakes, wood, resins, polymer materials (crosslinked or otherwise), polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, composite materials, fibers of cellulose (e.g., viscose cellulosic fibers, oil coated cellulosic fibers, and fibers derived from a plant product like paper fibers), carbon including carbon fibers, melt-processed inorganic fibers (e.g., basalt fibers, woolastonite fibers, non-amorphous metallic fibers, metal oxide fibers, mixed metal oxide fibers, ceramic fibers, and glass fibers), polymeric fibers (e.g., polypropylene fibers and poly(acrylic nitrile) fibers), metal oxide fibers, mixed metal oxide fibers, and the like, and any combination thereof. Suitable composite materials may comprise a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and any combination thereof.

In some embodiments, LCMs may include a degradable material. Nonlimiting examples of suitable degradable materials may include, but are not limited to, degradable polymers (crosslinked or otherwise), dehydrated compounds, and/or mixtures of the two. As used herein, the term "degradable" and all of its grammatical variants (e.g., "degrade," "degradation," "degrading," and the like) refer to the dissolution or chemical conversion of materials into smaller components, intermediates, or end products by at least one of solubilization, hydrolytic degradation, biologically formed entities (e.g., by bacteria or enzymes), chemical reactions, electrochemical processes, thermal reactions, or reactions induced by radiation. In some instances, the degradation of the material may be sufficient for the mechanical properties of the material to reduce to a point that the material no longer maintains its integrity and, in essence, falls apart. The conditions for degradation are generally wellbore conditions where an external stimuli may be used to initiate or effect the rate of degradation. For example, the pH of the fluid that interacts with the material may be changed by introduction of an acid or a base. The term "wellbore environment" includes both naturally occurring wellbore environments and introduced materials into the wellbore.

Specific examples of LCMs may include, but not be limited to, BARACARB® particulates (ground marble, available from Halliburton Energy Services, Inc., e.g., BARACARB® 5, BARACARB® 25, BARACARB® 150, BARACARB® 600, BARACARB® 1200), STEELSEAL® particulates (resilient graphitic carbon, available from Halliburton Energy Services, Inc., e.g., STEELSEAL® powder, STEELSEAL® 50, STEELSEAL® 150, STEELSEAL® 400 and STEELSEAL® 1000), WALL-NUT particulates (ground walnut shells, available from Halliburton Energy Services, Inc., e.g., WALL-NUT® M, WALL-NUT® coarse, WALL-NUT® medium, and WALL-NUT® fine), BARAPLUG® (sized salt water, available from Halliburton Energy Services, Inc., e.g., including BARAPLUG® 20, BARAPLUG® 50, and BARAPLUG® 3/300); BARA-FLAKE® (calcium carbonate and polymers, available from Halliburton Energy Services, Inc.), carbon fibers derived from poly(acrylonitrile) (also referred to as PAN fibers), PANEX fibers (carbon fibers, available from Zoltek, e.g., PANEX® 32, PANEX® 35-0.125", and PANEX® 35-0.25"), PANOX (oxidized PAN fibers, available from SGL Group), rayon fibers including BDF™ 456 (rayon fibers, available from Halliburton Energy Services, Inc.), poly(lactide) ("PLA") fibers, alumina fibers, cellulosic fibers, BAROFIBRE® fibers (cellulosic fiber, available from Halliburton Energy Services, Inc., e.g., including BAROFIBRE® and BAROFIBRE® C), and the like, and any combination thereof.

The MEMS portion of the MEMS-LCMs described herein may, in some instances, be passive radio frequency identification devices (RFIDs). RFIDs combine a microchip with an antenna (the RFID chip and the antenna are collectively referred to as the "transponder" or the "tag"). The antenna provides the RFID chip with power when exposed to a narrow band, high frequency electromagnetic field from a transceiver. A dipole antenna or a coil, depending on the operating frequency, connected to the RFID chip, powers the transponder when current is induced in the antenna by an RF signal from the transceiver's antenna. Such a device can return a unique identification "ID" number by modulating and re-radiating the radio frequency (RF) wave.

Given the wellbore environment and volume of MEMS-LCMS that may be utilized in the various methods, passive RFIDs may be particularly useful in the methods described herein due to their ability to function without a battery, as well as, their low cost, indefinite life, simplicity, efficiency, and identification capabilities at a distance without contact (tether-free information transmission ability). Each of the employed MEMS-LCM types may have antennas that respond to RF waves of different frequencies, so as to uniquely identify each type of MEMS-LCM. Within the United States, commonly used operating bands for RFID systems center on one of the three government assigned frequencies: 125 kHz, 13.56 MHz or 2.45 GHz. A fourth frequency, 27.125 MHz, has also been assigned. When the 2.45 GHz carrier frequency is used, the range of an RFID chip can be many meters. While this is useful for remote sensing, there may be multiple transponders within the RF field. In order to prevent these devices from interacting and garbling the data, anti-collision schemes are used, as are known in the art.

The MEMS sensors suitable for use in conjunction with MEMS-LCMS that include passive RFIDs may be active RFID readers, which are well-known in the RFID art.

Additional examples of the MEMS portion of the MEMS-LCMs described herein and MEMS sensors may include, but are not limited to, active RFIDs with RFID readers (e.g., RFIDs having a battery and periodically transmitting an identifying signal) and battery-assisted passive RFID with RFID readers (e.g., RFIDs having a battery and activated to transmit an identifying signal in the presence of the RFID reader).

The MEMS-LCMs may be included in a drilling fluid 122 described herein at about 0.001 PPB to about 150 PPB in the drilling fluid, including any subset therebetween.

The MEMS-LCMs described herein may be formed of a MEMS coupled to or incorporated into polymers (e.g., polytetrafluoroethylene, fluoropolyesters, polypropylene, polyethylene, polydimethylsilane, polylactic acid, poly(lactic-co-glycolic acid), cellulosics, metals (e.g., stainless steel and tin), ceramics (e.g., oxides like alumina, carbides, borides, nitrides, and silicides), minerals (e.g., kaolin and feldspar), glasses, borosilicate glass, or the like, including any material described herein relative to the LCMs, to form the MEMS-LCMs described herein.

The MEMS-LCMs described herein may, in some instances, have a specific gravity of about 0.5 to about 7, including any subset therebetween.

The MEMS-LCMs described herein may be any known shapes of materials, including substantially spherical materials, fibrous materials, polygonal materials (such as cubic materials), and combinations thereof.

The MEMS-LCMs described herein may, in some instances, have a diameter of about 1 micron or greater (e.g., about 1 micron to about 25 mm, including any subset therebetween). Generally, the upper size limit for the MEMS-LCMs is dictated by the nozzles of the drill bit, which may, in some instances, be up to about 30 mm. As used herein, the term "diameter" refers to the smallest cross-sectional diameter of the MEMS-LCM.

The drilling fluids 122 described herein may optionally further include an additive. The additives may be included may be included at about 0.001 PPB to about 150 PPB in the treatment fluid, including any subset therebetween.

Examples of additives may include, but are not limited to, salts, weighting agents, inert solids, emulsifiers, dispersion aids, corrosion inhibitors, emulsion thinners, emulsion thickeners, viscosifying agents, surfactants, pH control additives, foaming agents, breakers, biocides, crosslinkers, stabilizers, chelating agents, scale inhibitors, gas, oxidizers, reducers, and any combination thereof. A person of ordinary skill in the art, with the benefit of this disclosure, will recognize when an additive should be included in a wellbore strengthening fluid and/or drilling fluid, as well as an appropriate amount of said additive to include.

In some instances, the disclosed MEMS-LCMs may directly or indirectly affect the components and equipment of the disclosed drilling assemblies 100,200,300,400. For example, the MEMS-LCMs may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a filter (e.g., diatomaceous earth filters), a heat exchanger, or any fluid reclamation equipment. The fluid processing unit(s) 128 may further include one or more sensors, gauges, pumps, compressors, and the like used to store, monitor, regulate, and/or recondition the exemplary MEMS-LCMs.

The disclosed MEMS-LCMs may directly or indirectly affect the pump 120, which representatively includes any conduits, pipelines, trucks, tubulars, and/or pipes used to fluidically convey the MEMS-LCMs downhole, any pumps, compressors, or motors (e.g., topside or downhole) used to drive the MEMS-LCMs into motion, any valves or related joints used to regulate the pressure or flow rate of the MEMS-LCMs, and any sensors (i.e., pressure, temperature, flow rate, etc.), gauges, and/or combinations thereof, and the like. The disclosed MEMS-LCMs may also directly or indirectly affect the mixing hopper 134 and the retention pit 132 and their assorted variations.

The disclosed MEMS-LCMs may also directly or indirectly affect the various downhole equipment and tools that may come into contact with the MEMS-LCMs such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed MEMS-LCMs may also directly or indirectly affect any downhole heat exchangers, valves and corresponding actuation devices, tool seals, packers and other wellbore isolation devices or components, and the like associated with the wellbore 116. The disclosed MEMS-LCMs may also directly or indirectly affect the drill bit 114, which may include, but is not limited to, roller cone bits, PDC bits, natural diamond bits, any hole openers, reamers, coring bits, etc.

While not specifically illustrated herein, the disclosed MEMS-LCMs may also directly or indirectly affect any transport or delivery equipment used to convey the MEMS-LCMs to the drilling assembly 100,200,300,400 such as, for example, any transport vessels, conduits, pipelines, trucks, tubulars, and/or pipes used to fluidically move the MEMS-LCMs from one location to another, any pumps, compressors, or motors used to drive the MEMS-LCMs into motion, any valves or related joints used to regulate the pressure or flow rate of the MEMS-LCMs, and any sensors (i.e., pressure and temperature), gauges, and/or combinations thereof, and the like.

In some embodiments, a wellbore may be drilled penetrating a subterranean formation with a drilling fluid that includes a base fluid, at least one type of MEMS-LCMs, and at least one LCM that is substantially similar to at least one of the types of MEMS-LCMs. The absence, presence, or concentration of the various types of MEMS-LCMs may be measured with MEMS sensors disposed in a drilling assembly in at least one location selected from the group consisting of (1) along the drill string; (2) along a feed pipe fluidically coupled to the drill string upstream of the wellbore; (3) along a flow line fluidly coupled to the drill string downstream of the wellbore; (4) at the wellhead, (5) at the pump, (6) at a slip joint in a subsea drilling assembly, (7) at a riser of a subsea drilling assembly, (8) at a BOP, (9) along a casing, and (10) along a wireline extending into a portion of the wellbore. The absence, presence, or concentration of the various types of MEMS-LCMs at each location may be compared, and the comparison may be used in changing the composition of the drilling fluid.

In some instances, the composition of the drilling fluid may be changed by adding LCMs with greater diameter or density than the MEMS-LCMs that experience lost circulation. Further, the concentration of LCMs substantially similar to the MEMS-LCMs that experience lost circulation may be decreased.

In some instances, the composition of the drilling fluid may be changed by adding LCMs that are substantially similar to the MEMS-LCMs that provide wellbore strengthening. In some instances, the properties of the drilling fluid may be changed. For example, the rheology may be changed by adding a viscosifier or adding a breaker. In another example, the water:oil ratio may be changed. In yet another example, the density or weight of the drilling fluid may be changed by increasing the concentration of weighting agents or light-weight additives in the drilling fluid. In another example, the gel strength of the drilling fluid may be changed by adding a crosslinker or breaker to the drilling fluid.

Alternatively or in combination with changes to the drilling fluid composition, the drilling parameters may be changed in response to the evaluation of wellbore strengthening and lost circulation. Exemplary parameters may include, but are not limited to, rate of penetration of the drill bit into the formation, circulation rate or flow rate of the drilling fluid, reaming, weight on bit, rpm of the drill bit, choke pressure (e.g., in managed pressure drilling operations), and the like.

The information garnered from the methods described herein may be applied to simulating further drilling operations. For example, in some instances, the data collected from a drilling operation using the MEMS-LCMs may be stored and used in a program that uses geo-mechanical models to build drilling programs for other wells. The collected data may include the characteristics of the MEMS-LCMs (e.g., size, specific gravity, and shape) that provide for wellbore strengthening, experience fluid loss into the formation, or neither (i.e., pass through the system substantially unchanged in concentration). The collected data may also include such characteristics and performance downhole correlated to the lithology (i.e., rock characteristics) of the formation.

Embodiments disclosed herein include Embodiment A, Embodiment B, and Embodiment C.

Embodiment A is a method that includes drilling at least a portion of a wellbore penetrating a subterranean formation with a drilling fluid that comprises a base fluid, a plurality of MEMS-LCMs, and a plurality of LCMs, wherein the MEMS-LCMs and the LCMs are substantially similar in size, shape, and specific gravity; measuring a first concentration of the MEMS-LCMs in the drilling fluid before circulating the drilling fluid through the wellbore; measuring a second concentration of the MEMS-LCMs in the drilling fluid after circulating the drilling fluid through the wellbore; performing a comparison of the first and second concentrations of the MEMS-LCMs; and changing a composition of the drilling fluid based on the comparison.

Embodiment A may have one or more of the following additional elements in any combination: Element A1: the method further including measuring a third concentration of the MEMS-LCMs in the drilling fluid while the drilling fluid is circulating through the wellbore; and wherein performing the comparison of the first and second concentrations of the MEMS-LCMs further involves comparing the first, second, and third concentrations of MEMS-LCMs; Element A2: wherein changing the composition of the drilling fluid involves increasing the concentration of the LCMs; Element A3: wherein the LCMs are first LCMs, and wherein changing the composition of the drilling fluid involves adding a plurality of second LCMs to the drilling fluid; Element A4: Element A3 and wherein the second LCMs have a larger diameter than the first LCMs; Element A5: Element A3 and wherein the second LCMs have a greater specific gravity than the first LCMs; Element A6: wherein the LCMs are first LCMs and the MEMS-LCMs are first MEMS-LCMs, the drilling fluid further comprising a plurality of second LCMs and a plurality of second MEMS-LCMs, wherein the second MEMS-LCMs and the second LCMs are substantially similar in size, shape, and specific gravity, and wherein the first MEMS-LCMs and the second MEMS-LCMs exhibit different signatures readable by a MEMS sensor, the method further comprising: measuring a first concentration of the second MEMS-LCMs in the drilling fluid before circulating the drilling fluid through the wellbore; measuring a second concentration of the second MEMS-LCMs in the drilling fluid after circulating the drilling fluid through the wellbore; performing a second comparison of the first and second concentrations of the second MEMS-LCMs; and changing the composition of the drilling fluid based on the comparison and the second comparison; and Element A7: wherein the plurality of the MEMS-LCMs comprise a passive RFID.

By way of non-limiting example, exemplary combinations applicable to Embodiment A include: Element A1 in combination with Element A2; Element A3 in combination with at least one of Elements A1 and A2 and optionally in further combination with at least one of Elements A4 and A5; Element A6 in combination with any of the foregoing; Element A6 in combination with at least one of Elements A1-A5; Element A7 in combination with any of the foregoing; and Element A7 in combination with at least one of Elements A1-A6.

Embodiment B is a method that includes drilling at least a portion of a wellbore penetrating a subterranean formation with a drilling fluid that comprises a base fluid, a plurality of MEMS-LCMs, and a plurality of LCMs, wherein the MEMS-LCMs and the LCMs are substantially similar in size, shape, and specific gravity; measuring a first concentration and a second concentration of the MEMS-LCMs in the drilling fluid at a first location and a second location in the wellbore; performing a comparison of the first and second concentrations of the MEMS-LCMs; and changing a composition of the drilling fluid based on the comparison.

Embodiment B may have one or more of the following additional elements in any combination: Element B1: measuring a third concentration of the MEMS-LCMs in the drilling fluid before circulating the drilling fluid through the wellbore; and wherein performing the comparison of the first and second concentrations of the MEMS-LCMs further involves comparing the first, second, and third concentrations of MEMS-LCMs; Element B2: measuring a third concentration of the MEMS-LCMs in the drilling fluid after circulating the drilling fluid through the wellbore; and wherein performing the comparison of the first and second concentrations of the MEMS-LCMs further involves comparing the first, second, and third concentrations of MEMS-LCMs; Element B3: measuring a third concentration of the MEMS-LCMs in the drilling fluid before circulating the drilling fluid through the wellbore; measuring a fourth concentration of the MEMS-LCMs in the drilling fluid after circulating the drilling fluid through the wellbore; and wherein performing the comparison of the first and second concentrations of the MEMS-LCMs further involves comparing the first, second, third, and fourth concentrations of MEMS-LCMs; Element B4: wherein changing the composition of the drilling fluid involves increasing the concentration of the LCMs; Element B5: wherein the LCMs are first LCMs, and wherein changing the composition of the drilling fluid involves adding a plurality of second LCMs to the drilling fluid; Element B6: wherein the LCMs are first LCMs and the MEMS-LCMs are first MEMS-LCMs, the drilling fluid further comprising a plurality of second LCMs and a plurality of second MEMS-LCMs, wherein the second MEMS-LCMs and the second LCMs are substantially similar in size, shape, and specific gravity, and wherein the first MEMS-LCMs and the second MEMS-LCMs exhibit different signatures readable by a micro-electro-mechanical systems (MEMS) sensor, the method further comprising: measuring a first concentration and a second concentration of the second MEMS-LCMs in the drilling fluid at the first location and the second location in the wellbore; performing a second comparison of the first and second concentrations of the second MEMS-LCMs; and changing the composition of the drilling fluid based on the comparison and the second comparison; and Element B7: wherein the plurality of the MEMS-LCMs comprise a passive RFID.

By way of non-limiting example, exemplary combinations applicable to Embodiment B include: one of Elements B1-B3 in combination with Element B4; one of Elements B1-B3 in combination with Element B5 and optionally in further combination with Element B4; Element B6 in combination with one of Elements B1-B3; Element B6 in combination with at least one of Elements B4-B5 and optionally in further combination with one of Elements B1-B3; Element B7 in combination with any of the foregoing; Element B7 in combination with one of Elements B1-B3; and Element B7 in combination with at least one of Elements B4-B6.

Embodiment C is a system that includes a drilling assembly with a drill string extending therefrom, through a blowout preventer (BOP) and a wellhead and into a wellbore penetrating a subterranean formation; a wireline extending from the drilling assembly and into the wellbore; a pump fluidly coupled to the drill string, the drill string containing a drilling fluid that comprises a base fluid, a plurality of MEMS-LCMs, and a plurality of LCMs, wherein the MEMS-LCMs and the LCMs are substantially similar in size, shape, and specific gravity; and at least one MEMS sensor in at least one location selected from the group consisting of (1) along the drill string; (2) along a feed pipe fluidly coupled to the drill string upstream of the wellbore; (3) along a flow line fluidly coupled to the drill string downstream of the wellbore; (4) at the wellhead, (5) at the pump, (6) at the BOP, (7) along the casing, and (8) along the wireline. Embodiment C may further include wherein the at least one MEMS sensor is an active RFID reader and the plurality of the MEMS-LCMs comprise a passive RFID.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A method comprising:
    drilling at least a portion of a wellbore penetrating a subterranean formation with a drilling fluid that comprises a base fluid, a plurality of micro-electro-mechanical systems lost circulation materials (MEMS-LCMs), and a plurality of lost circulation materials (LCMs), wherein the MEMS-LCMs and the LCMs are substantially similar in size, shape, and specific gravity;
    measuring a first concentration of the MEMS-LCMs in the drilling fluid before circulating the drilling fluid through the wellbore;
    measuring a second concentration of the MEMS-LCMs in the drilling fluid after circulating the drilling fluid through the wellbore;
    performing a comparison of the first and second concentrations of the MEMS-LCMs; and
    changing a composition of the drilling fluid based on the comparison.

2. The method of claim 1 further comprising:
    measuring a third concentration of the MEMS-LCMs in the drilling fluid while the drilling fluid is circulating through the wellbore; and
    wherein performing the comparison of the first and second concentrations of the MEMS-LCMs further involves comparing the first, second, and third concentrations of MEMS-LCMs.

3. The method of claim 1, wherein changing the composition of the drilling fluid involves increasing the concentration of the LCMs.

4. The method of claim 1, wherein the LCMs are first LCMs, and wherein changing the composition of the drilling fluid involves adding a plurality of second LCMs to the drilling fluid.

5. The method of claim 4, wherein the second LCMs have a larger diameter than the first LCMs.

6. The method of claim 4, wherein the second LCMs have a greater specific gravity than the first LCMs.

7. The method of claim 1, wherein the LCMs are first LCMs and the MEMS-LCMs are first MEMS-LCMs, the drilling fluid further comprising a plurality of second LCMs and a plurality of second MEMS-LCMs, wherein the second MEMS-LCMs and the second LCMs are substantially similar in size, shape, and specific gravity, and wherein the first MEMS-LCMs and the second MEMS-LCMs exhibit different signatures readable by a micro-electro-mechanical systems (MEMS) sensor, the method further comprising:
    measuring a first concentration of the second MEMS-LCMs in the drilling fluid before circulating the drilling fluid through the wellbore;
    measuring a second concentration of the second MEMS-LCMs in the drilling fluid after circulating the drilling fluid through the wellbore;
    performing a second comparison of the first and second concentrations of the second MEMS-LCMs; and
    changing the composition of the drilling fluid based on the comparison and the second comparison.

8. The method of claim 1, wherein the plurality of the MEMS-LCMs comprise a passive radio frequency identification device (RFID).

9. A method comprising:
    drilling at least a portion of a wellbore penetrating a subterranean formation with a drilling fluid that comprises a base fluid, a plurality of micro-electro-mechanical systems lost circulation materials (MEMS-LCMs), and a plurality of lost circulation materials (LCMs), wherein the MEMS-LCMs and the LCMs are substantially similar in size, shape, and specific gravity;
    measuring a first concentration and a second concentration of the MEMS-LCMs in the drilling fluid at a first location and a second location in the wellbore;
    performing a comparison of the first and second concentrations of the MEMS-LCMs; and
    changing a composition of the drilling fluid based on the comparison.

10. The method of claim 9 further comprising:
    measuring a third concentration of the MEMS-LCMs in the drilling fluid before circulating the drilling fluid through the wellbore; and wherein performing the comparison of the first and second concentrations of the MEMS-LCMs further involves comparing the first, second, and third concentrations of MEMS-LCMs.

11. The method of claim 9 further comprising:
measuring a third concentration of the MEMS-LCMs in the drilling fluid after circulating the drilling fluid through the wellbore; and
wherein performing the comparison of the first and second concentrations of the MEMS-LCMs further involves comparing the first, second, and third concentrations of MEMS-LCMs.

12. The method of claim 9 further comprising:
measuring a third concentration of the MEMS-LCMs in the drilling fluid before circulating the drilling fluid through the wellbore;
measuring a fourth concentration of the MEMS-LCMs in the drilling fluid after circulating the drilling fluid through the wellbore; and
wherein performing the comparison of the first and second concentrations of the MEMS-LCMs further involves comparing the first, second, third, and fourth concentrations of MEMS-LCMs.

13. The method of claim 9, wherein changing the composition of the drilling fluid involves increasing the concentration of the LCMs.

14. The method of claim 9, wherein the LCMs are first LCMs, and wherein changing the composition of the drilling fluid involves adding a plurality of second LCMs to the drilling fluid.

15. The method of claim 9, wherein the LCMs are first LCMs and the MEMS-LCMs are first MEMS-LCMs, the drilling fluid further comprising a plurality of second LCMs and a plurality of second MEMS-LCMs, wherein the second MEMS-LCMs and the second LCMs are substantially similar in size, shape, and specific gravity, and wherein the first MEMS-LCMs and the second MEMS-LCMs exhibit different signatures readable by a micro-electro-mechanical systems (MEMS) sensor, the method further comprising:

measuring a first concentration and a second concentration of the second MEMS-LCMs in the drilling fluid at the first location and the second location in the wellbore;
performing a second comparison of the first and second concentrations of the second MEMS-LCMs; and
changing the composition of the drilling fluid based on the comparison and the second comparison.

16. The method of claim 9, wherein the plurality of the MEMS-LCMs comprise a passive radio frequency identification device (RFID).

17. A system comprising:
a drilling assembly with a drill string extending therefrom, through a blowout preventer (BOP) and a wellhead and into a wellbore penetrating a subterranean formation;
a wireline extending from the drilling assembly and into the wellbore;
a pump fluidly coupled to the drill string, the drill string containing a drilling fluid that comprises a base fluid, a plurality of micro-electro-mechanical systems lost circulation materials (MEMS-LCMs), and a plurality of lost circulation materials (LCMs), wherein the MEMS-LCMs and the LCMs are substantially similar in size, shape, and specific gravity; and
at least one micro-electro-mechanical systems (MEMS) sensor in at least one location selected from the group consisting of (1) along the drill string; (2) along a feed pipe fluidly coupled to the drill string upstream of the wellbore; (3) along a flow line fluidly coupled to the drill string downstream of the wellbore; (4) at the wellhead, (5) at the pump, (6) at the BOP, (7) along the casing, and (8) along the wireline.

18. The system of claim 17, wherein the at least one MEMS sensor is an active radio frequency identification device (RFID) reader and the plurality of the MEMS-LCMs comprise a passive RFID.

* * * * *